Figure 1:
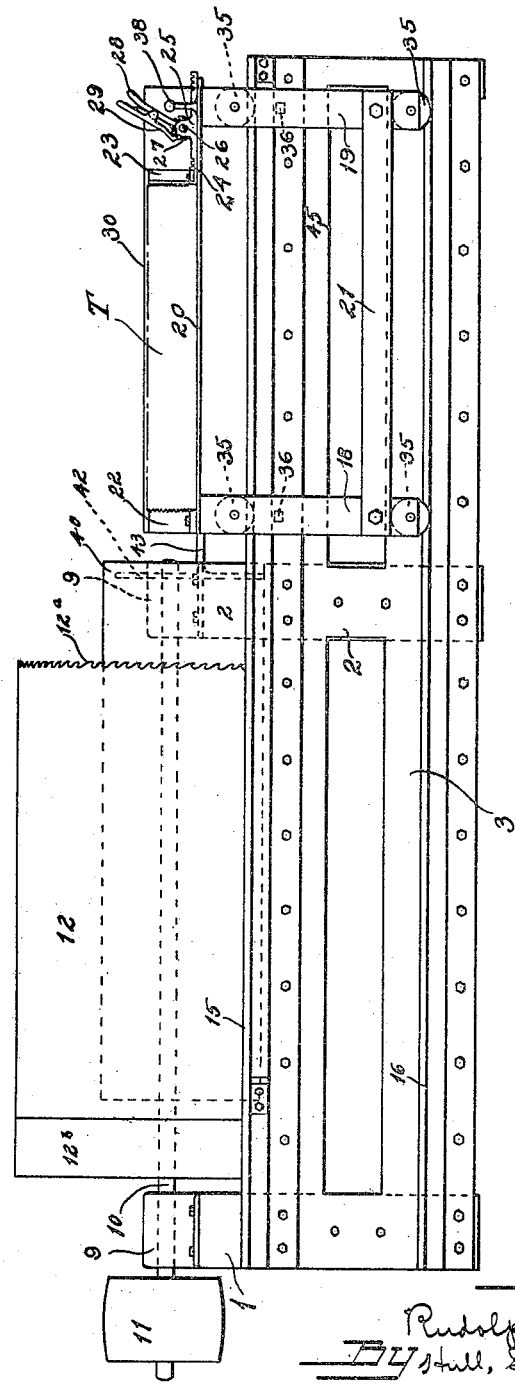

R. P. GERLACH.
BARREL STAVE SAWING MACHINE.
APPLICATION FILED SEPT. 22, 1919.

1,379,682.

Patented May 31, 1921.
3 SHEETS—SHEET 1.

R. P. GERLACH.
BARREL STAVE SAWING MACHINE.
APPLICATION FILED SEPT. 22, 1919.

1,379,682.

Patented May 31, 1921.
3 SHEETS—SHEET 2.

R. P. GERLACH.
BARREL STAVE SAWING MACHINE.
APPLICATION FILED SEPT. 22, 1919.

1,379,682.

Patented May 31, 1921.
3 SHEETS—SHEET 3.

Inventor
Rudolph P. Gerlach
By Hull, Smith, Brock & West
Atty's

UNITED STATES PATENT OFFICE.

RUDOLPH P. GERLACH, OF CLEVELAND, OHIO.

BARREL-STAVE-SAWING MACHINE.

1,379,682.   Specification of Letters Patent.   Patented May 31, 1921.

Application filed September 22, 1919. Serial No. 325,320.

*To all whom it may concern:*

Be it known that I, RUDOLPH P. GERLACH, a citizen of the United States, residing at Cleveland, in the county of Cuyahoga and State of Ohio, have invented a certain new and useful Improvement in Barrel-Stave-Sawing Machines, of which the following is a full, clear, and exact description, reference being had to the accompanying drawings.

This invention relates generally to the art of barrel making and has particular reference to stave sawing machines of the class wherein cylindrical or bilged drum saws are employed.

In prevailing types of machines of this character the carriage for the timber from which the staves are to be cut is mounted upon a track situated to one side of the saw and the sawing stress is exerted upon the timber in a plane perpendicular to the carriage track and between it and the axis of the saw. This results in a series or succession of unfavorable circumstances. To explain: The thrust of the saw tends to tilt the carriage, causing the timber to bind with excessive friction upon the saw and distort the saw to such an extent that the finished stave is untrue as to the transverse curvature which corresponds to the circle of the finished package of which it is intended to form a part. Furthermore, in order to withstand these strains, the frame of the machine has had to be unduly heavy; the carriage has had to be correspondingly heavy and braced with the result that its weight prevents its reciprocating at a desirable speed; the thickness of the saw has had to be such as would prevent distortion beyond a practical degree; and the saw carrying spindle and its bearings have had to conform in size to these abnormal conditions.

It is the object of this invention to correct the error which has been responsible for the foregoing difficulties. It comprehends the idea of situating the rails whereof the carriage track is formed in a plane tangent to the curve of the saw and disposing the track with respect to the saw so that the carriage will support the timber with its bulk or mass divided substantially equally on each side of the transverse axis of the saw. Such an arrangement eliminates any tendency to tilt the timber, which obviates lateral pressure on either side of the saw blade and relieves the saw of all but the cutting strain which, under this arrangement, is reduced to a minimum. This permits a lighter construction throughout and allows the use of a thinner saw. It allows the saw to operate much more easily, produces staves that are absolutely true as to transverse curvature, eliminates the warp which was present in the staves cut on the former type of machine, and saves material by cutting a kerf of less width than was produced when it was necessary to use the thicker saws. Thus the invention affords economy in the original cost as well as in up-keep, saves material by permitting a greater number of staves to be cut from a timber of a given dimension, and reserves the strength of the operator in that it can be manipulated with greater ease than its predecessors.

Further objects sought to be attained and relating more to structural features are the provision of a machine of the character set forth wherein saws of various diameters may be used; wherein the timber is supported so that it is divided substantially equally above and below the horizontal axis of the saw; and wherein the stave receiving trough is so situated that the staves fall naturally in a proper position to be removed by the ejector.

Figure 2:
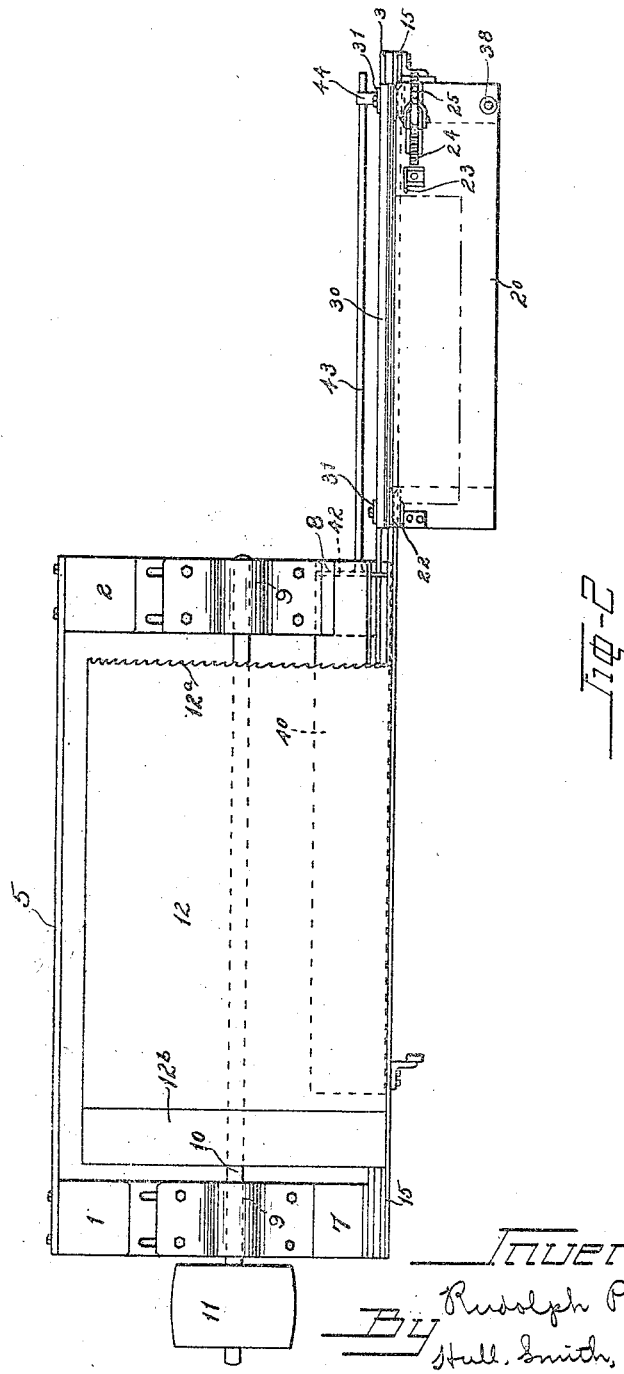
Figure 3:
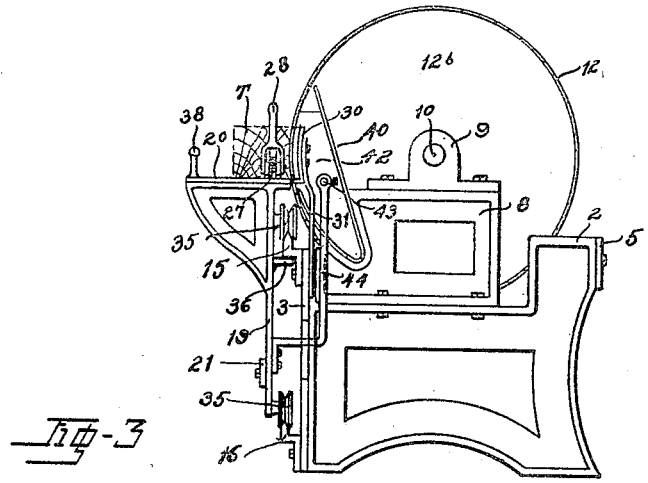
Figure 4:
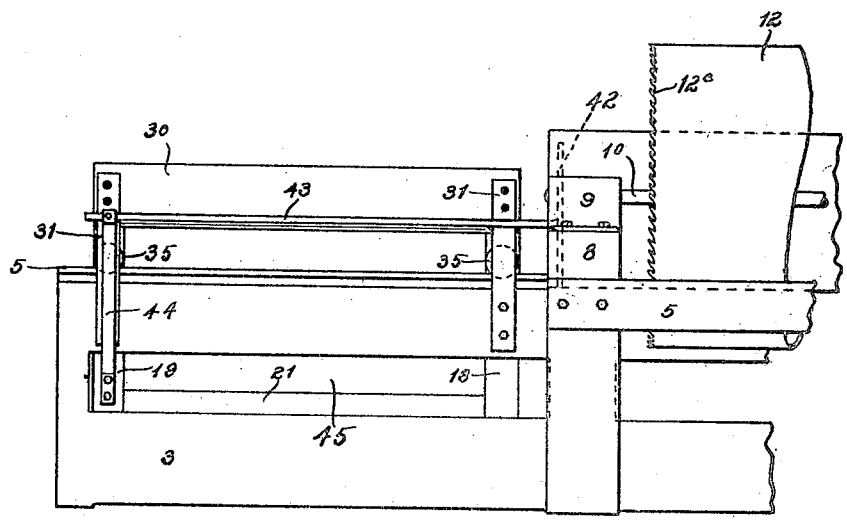

In the accompanying drawings which constitute a part thereof, Figure 1 is a front side elevation of a barrel stave sawing machine embodying my invention; Fig. 2 is a plan view of the machine; Fig. 3 is an end elevation of the machine as viewed from the right of Fig. 1; and Fig. 4 is a fragmentary rear side elevation.

While my invention is just as applicable to a sawing machine incorporating bilged drum saws as to those having drum saws of the cylindrical type, for clearness and convenience of illustration I have elected to show the invention incorporated in a stave sawing machine wherein a cylindrical saw is employed.

The machine herein illustrated consists of standards 1 and 2 that are properly spaced apart and connected together by a longitudinal side plate 3 and by a tie member 5. Adjustable from front to rear of the respective standards 1 and 2 are housings 7 and 8 that are surmounted by journal boxes 9 within which a shaft 10 is supported. The shaft 10 is shown as equipped with a pulley 11 for driving it, and between the standards 1 and 2 it supports a cylindrical drum saw 12.

Saws of this character are common in the art and they consist of thin sheet steel cylindrical shells having teeth at one end and at the other are connected to a circular head through which they may be secured to the driving shaft. In the present instance, the teeth are designated 12$^a$ and the head 12$^b$.

Secured to the plate 3 and extending along its upper and lower edges are rails 15 and 16, respectively. These rails constitute the track for the carriage which supports the timber from which the staves are sawed. The carriage comprises end brackets 18 and 19 which are properly spaced apart and connected together at their upper ends by a plate 20, and at their lower ends by a tie member 21. The timber, designated T, which is shown in full lines in Fig. 3 and in dot-and-dash lines in Figs. 1 and 2, is adapted to be clamped in correct position upon plate 20 between a stationary jaw 22 and a movable jaw 23, the latter being shown as carried by a rack 24 that is guided through a member 25 on plate 20, and within which member is journaled a shaft 26 loosely carrying a pinion 27 that meshes with the rack and is adapted to be rotated by a lever 28 when the lever is locked to the pinion in any angular position with respect thereto by a pawl 29 that is pivoted to the lever. The coarse adjustment of the movable jaw for timbers of different lengths according to the lengths of staves to be sawed is made by freeing the pinion and sliding the rack, and the clamping action, after the coarse adjustment is made, is accomplished by swinging the lever when connected through the pawl 29 with the pinion 27. This is in accordance with the usual practice and constitutes no part of my present invention. A gage plate 30 is supported by arms 31 from the inner side of the front plate 3 and serves to properly locate the timber for successive cuts and accordingly determine the thickness of the staves.

A pair of vertically spaced rollers 35 are applied to each of the carriage brackets 18 and 19 and are arranged to travel the rails 15 and 16. Lugs 36 are shown as projecting inwardly from the brackets 18 and 19 beneath the horizontal shoulder of the upper rail 15 for preventing the carriage from lifting sufficiently to disengage the rollers from the rails. The carriage is adapted to be reciprocated along the track by an operator standing in front of the machine and grasping a handle 38 which is shown as rising from the right hand end of the carriage as the machine is viewed in Figs. 1 and 2.

A trough 40 shown as supported by the housing 8, is disposed within the drum saw in a position to receive the staves as they are cut from the timber. An ejector plate 42 that is of a size and shape corresponding substantially to the interior cross sectional area of the trough is reciprocated along the trough in unison with the movements of the carriage by reason of its connection with the latter through a stem 43 and bracket 44, the bracket 44 extending through an elongated opening 45 in the plate 3 and being secured to the carriage bracket 19, as clearly shown in Fig. 4.

The method of operating the machine will be readily understood, and it is this: The operator, after clamping a piece of timber to the carriage, moves the carriage in the direction of the saw until a stave has been completely severed from the timber and has fallen into the receiving trough. He then retracts the carriage to normal position and in so doing withdraws the stave from the trough by means of the ejector plate 42. Before repeating the foregoing performance, the operator unclamps the timber and moves it inwardly against the gage plate 30, after which he continues as above.

Attention is directed to these salient facts which constitute the essential features of the invention and which were referred to in a general way in the beginning of this specification: That the plane of the track, and the direction of bearing of the carriage thereupon are tangent to the curvature of the saw and at right angles to the horizontal radius of the saw; that the timber is divided substantially equally on both sides of the transverse axis of the saw; and that the parts are so arranged that the severed staves will fall naturally in a proper position within the receiving trough to be removed by the ejector.

It will be noted also that by reason of the adjustability of the housings 7 and 8, saws of various diameters may be employed, the housings being set forwardly or rearwardly as required to bring the periphery of the saw coincident with the plane of the track.

Having thus described my invention, what I claim is:—

1. In a barrel stave sawing machine, the combination of a drum saw, means for driving the saw, a track comprising a pair of rails disposed one above the other and parallel to the adjacent longitudinal contour of the saw in a plane substantially tangent to the saw and at right angles to the horizontal radius of the saw, and a carriage movable along the track for supporting a piece of timber and delivering it to the saw.

2. In a barrel stave sawing machine, the combination of a drum saw, means for driving the saw, a track comprising a pair of rails disposed one above the other in a plane parallel to the adjacent longitudinal contour of, and tangent to, the saw and substantially at right angles to the horizontal radius of the saw, the track involving a shoulder that is parallel to the supporting surfaces of the rails, and a carriage movable along the track for supporting a piece of timber and delivering it to the saw, the carriage having a part disposed beneath and in proximity to the aforesaid shoulder.

3. In a barrel stave sawing machine, the combination of a drum saw, means for driving the saw, a rail having parallel top and bottom surfaces extending parallel to the adjacent longitudinal contour of the saw, the supporting surface of the rail being in a plane substantially tangent to the saw and at right angles to the horizontal radius of the saw, a carriage movable along the rail for supporting a piece of timber and delivering it to the saw, and means incorporated in the carriage for engagement beneath the bottom surface of the rail for preventing the dislodgment of the carriage from the rail.

4. In a barrel stave sawing machine, the combination of a drum saw, means for driving the saw, a track the rails whereof lie in a plane substantially tangent to the saw and at right angles to the horizontal radius of the saw, and a carriage movable along the track and situated to support a piece of timber with its bulk substantially equally divided on both sides of said horizontal radius of the saw.

5. In a barrel stave sawing machine, the combination of a pair of standards, a longitudinal side plate connecting the standards, a shaft supported by the standards, a drum saw on the shaft, means for driving the shaft, a track carried by the front plate parallel to the adjacent longitudinal contour of the saw and in a plane substantially tangent to the saw and at right angles to the horizontal radius of the saw, a carriage having rollers which are arranged to travel upon the track, and means for maintaining the carriage upon the track.

6. In a barrel stave sawing machine, the combination of a drum saw, means for driving the saw, a track the rails whereof lie in a vertical plane tangent to the saw, and a carriage movable along the track for supporting a piece of timber and delivering it to the saw.

7. In a barrel stave sawing machine, the combination of a drum saw, means for driving the saw, a carriage supporting rail parallel to the adjacent longitudinal contour of the saw and in a plane substantially tangent to the saw and at right angles to the horizontal radius of the saw, and a carriage movable along the rail for supporting a piece of timber and delivering it to the saw.

In testimony whereof, I hereunto affix my signature.

RUDOLPH P. GERLACH.